(12) United States Patent
Murillo Carrasco et al.

(10) Patent No.: US 11,788,760 B2
(45) Date of Patent: Oct. 17, 2023

(54) POWER STEALING SYSTEM FOR LOW POWER THERMOSTATS

(71) Applicant: Ademco Inc., Golden Valley, MN (US)

(72) Inventors: Luis Carlos Murillo Carrasco, Chihuahua (MX); Robert D. Juntunen, Minnetonka, MN (US); Jesus Omar Ponce, Chihuahua (MX); Eduardo Saenz Balderrama, Panorámico (MX); Cesar Alejandro Arzate, Chihuahua (MX)

(73) Assignee: Ademco Inc., Golden Valley, MN (US)

( * ) Notice: Subject to any disclaimer, the term of this patent is extended or adjusted under 35 U.S.C. 154(b) by 43 days.

(21) Appl. No.: 17/089,413

(22) Filed: Nov. 4, 2020

(65) Prior Publication Data

US 2022/0136729 A1 May 5, 2022

(51) Int. Cl.
*F24F 11/88* (2018.01)
*F24F 11/62* (2018.01)
*H02J 3/00* (2006.01)
*H02J 3/32* (2006.01)
*H02J 7/02* (2016.01)

(52) U.S. Cl.
CPC ............. *F24F 11/88* (2018.01); *F24F 11/62* (2018.01); *H02J 3/00* (2013.01); *H02J 3/32* (2013.01); *H02J 7/02* (2013.01)

(58) Field of Classification Search
CPC .... F24F 11/88; F24F 11/62; H02J 3/00; H02J 3/32; H02J 7/02
See application file for complete search history.

(56) References Cited

U.S. PATENT DOCUMENTS

| | | | | |
|---|---|---|---|---|
| 3,648,793 A | * | 3/1972 | Linville | G01G 7/04 73/862.61 |
| 3,855,517 A | * | 12/1974 | Allport | H02J 7/16 320/123 |
| 3,990,000 A | * | 11/1976 | Digneffe | G05F 1/44 341/170 |
| 5,111,112 A | * | 5/1992 | Hsu | H05B 39/09 315/194 |

(Continued)

OTHER PUBLICATIONS

Prosecution History from U.S. Appl. No. 16/557,201, dated Nov. 26, 2019, 9 pps.

*Primary Examiner* — Daniel Kessie
*Assistant Examiner* — Brian K Baxter
(74) *Attorney, Agent, or Firm* — Greenberg Traurig, LLP; Ryan D. Sharp; David J. Dykeman

(57) ABSTRACT

Power stealing circuitry to provide power to a controller for an environmental control system. The power stealing circuitry may include a first circuit, to steal power when a load for a stage is switched off, e.g. de-energized. The power stealing circuitry may include a second circuit, e.g., a power trickle circuit, to steal power when the load is switched on, e.g., energized. The load may include a furnace, electrical heating element, heat pump, humidifier, electrostatic filter, air conditioning unit and so on. In some examples, the environmental control system may have one or many stages, each with a separate load. The controller may include power stealing circuitry for each stage of the environmental control system. In other words, the controller may include a first circuit and a second circuit for each stage of a multi-stage environmental control system.

19 Claims, 4 Drawing Sheets

(56) References Cited

U.S. PATENT DOCUMENTS

| | | | |
|---|---|---|---|
| 7,271,990 B2 | 9/2007 | Bryan | |
| 7,408,751 B1 | 8/2008 | Lien et al. | |
| 9,071,145 B2 | 6/2015 | Simard et al. | |
| 9,261,287 B2 | 2/2016 | Warren et al. | |
| 9,559,680 B2 | 1/2017 | Rakes | |
| 9,739,499 B2 | 8/2017 | Tu et al. | |
| 10,234,879 B2 | 3/2019 | Marschalkowski et al. | |
| 10,536,017 B2 | 1/2020 | Tu et al. | |
| 10,601,421 B1 | 3/2020 | Ponce et al. | |
| 2009/0109716 A1* | 4/2009 | Sadwick | H02M 5/293 363/125 |
| 2012/0019966 A1 | 1/2012 | DeFoer | |
| 2012/0199660 A1 | 8/2012 | Warren et al. | |
| 2012/0286689 A1* | 11/2012 | Newman, Jr. | H05B 41/3925 315/246 |
| 2012/0327544 A1 | 12/2012 | Peng et al. | |
| 2013/0285471 A1 | 10/2013 | Ren et al. | |
| 2014/0000858 A1* | 1/2014 | Frank | G05D 23/1905 236/1 C |
| 2016/0006274 A1* | 1/2016 | Tu | H02J 7/007184 320/162 |
| 2016/0018836 A1* | 1/2016 | Pawar | F24F 11/49 700/276 |
| 2018/0119976 A1* | 5/2018 | Kadah | F24F 11/89 |
| 2020/0224918 A1* | 7/2020 | Alhilo | G05F 1/62 |
| 2020/0358317 A1* | 11/2020 | Richter | H01F 38/14 |
| 2020/0375009 A1* | 11/2020 | Reh | H05B 47/19 |

\* cited by examiner

POWER STEALING SYSTEM FOR LOW POWER THERMOSTATS

TECHNICAL FIELD

The disclosure relates to thermostats for environmental control systems.

BACKGROUND

A building may include an environmental control system, such as a heating, ventilation, and air conditioning (HVAC) system, to control temperature, humidity, air quality and other environmental factors of rooms in the building. The room may have sensors that provide information to a controller, e.g. a thermostat, for the environmental control system. The controller may activate the environmental control system, based on information provided by the sensors, via field wires connected to the environmental control system. In some examples, the controller may include circuitry that needs an electrical power source. In some examples, the power source for the controller may be provided by the environmental control system, for controllers that include the C-wire as one of the field wire connectors. In other examples, for controllers without a C-wire connection, the power source for the controller may be a battery, or some other electrical energy storage element.

SUMMARY

In general, the disclosure is directed to power stealing circuitry to provide power to a controller for an environmental control system. The power stealing circuitry may include a first circuit, to steal power when a load for a stage is switched off, e.g. de-energized. The power stealing circuitry may include a second circuit, e.g., a power trickle circuit, to steal power when the load is switched on, e.g., energized. The load may include a furnace, electrical heating element, heat pump, humidifier, electrostatic filter, air conditioning unit and so on. In some examples, the environmental control system may have one or many stages, each with a separate load. The controller may include power stealing circuitry for each stage of the environmental control system. In other words, the controller may include a first circuit and a second circuit for each stage of a multi-stage environmental control system.

In one example, this disclosure describes a power stealing circuit that includes: a diode bridge rectifier comprising four diodes and connected to an alternating current (AC) power source; a current limiting element connected to a first output terminal of the diode bridge rectifier; an electrical energy storage element connected to the current limiting element and configured to receive electrical energy from the diode bridge rectifier through the current limiting element; and an isolation circuit connected to a second output terminal of the diode bridge rectifier and configured to isolate the second output terminal of the diode bridge rectifier from a circuit ground.

In another example, this disclosure describes a system that includes: a power stealing circuit with a diode bridge rectifier comprising four diodes and connected to an AC power source; a current limiting element connected to a first output terminal of the diode bridge rectifier; an electrical energy storage element connected to the current limiting element and configured to receive electrical energy from the diode bridge rectifier through the current limiting element; and an isolation circuit connected to a second output terminal of the diode bridge rectifier and configured to isolate the second output terminal of the diode bridge rectifier from a circuit ground.

In another example, this disclosure describes a method that includes: in response to de-energizing a load of a heating, ventilation, and air conditioning (HVAC) system, enabling a power stealing circuit, wherein the power stealing circuit comprises: a diode bridge rectifier comprising four diodes and connected to an AC power source of the HVAC system; a current limiting element connected to a first output terminal of the diode bridge rectifier; an electrical energy storage element connected to the current limiting element and configured to receive electrical energy from the diode bridge rectifier through the current limiting element; and an isolation circuit connected to a second output terminal of the diode bridge rectifier and configured to isolate the second output terminal of the diode bridge rectifier from a circuit ground; and providing electrical energy to the electrical energy storage element through the power stealing circuit.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
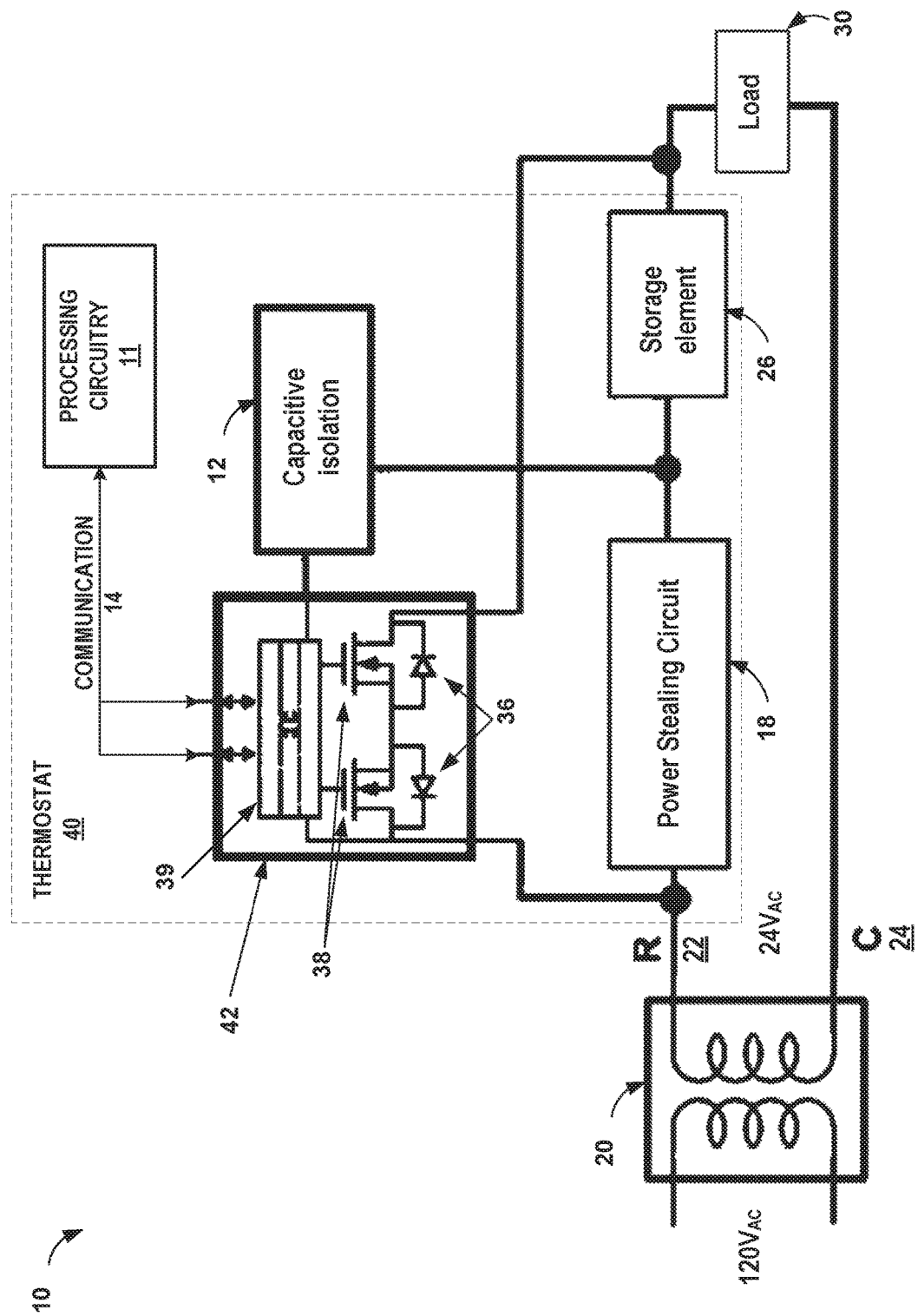
FIG. 1 is a block diagram illustrating a single stage controller with power stealing circuitry according to one or more techniques of this disclosure.

Controllers of environmental control systems that do not have a C-wire connection to provide power, may be configured as a low-power controller, e.g. may be configured to operate with little power to maximize the life of the energy storage element that supplies power to the controller. Examples of electrical energy storage elements include batteries, capacitors, and similar devices. A low-power controller may be configured to operate only when needed, e.g. may include low-power or sleep periods, and other techniques to operate with minimal power. A controller according to the techniques of this disclosure may also include power stealing circuitry to draw electrical energy from the power supplied to a load operated by the controller.

The power stealing circuitry may include a first circuit, to steal power when a load for a stage is switched off, e.g. de-energized. When the load, e.g. a furnace, is switched off, the first circuit, which includes a rectifier and a current limiter, forms a series circuit including the energy storage element, an isolation circuit, and the load. Current will flow through the first circuit charging the energy storage element. The energy storage element could be used in turn to power the low power controller or any other device.

The power stealing circuitry may also include a second circuit, e.g., a power trickle circuit, to steal power when the load is switched on, e.g., energized. Closing the load switch in the controller, e.g., switching on the load disables the first power stealing circuit for that load and power trickle circuit performs power stealing. The rectifier in the first circuit is configured to block any current that might come from the storage element current when any of switches S1, S2 or S3 are closed. In other words, the circuit architecture prevents interference from the first circuit during the load activation.

In this manner, the power stealing circuitry of this disclosure may provide power at any time, whether the load is on or off. In some examples, a multi-stage controller, e.g., with at least two loads, may enable both power stealing schemes to work at the same time, which may increase the amount of power delivered to the storage element, compared to either scheme alone. For example, a multi-stage controller may be configured to operate both a heating load (W) and a cooling load (Y). When the W-switch is ON and Y-switch is OFF, the second circuit, e.g., the power trickle circuit, for the W-load may provide electrical energy, e.g. to the storage element, at the same time that the first power stealing circuit for the Y-load may provide electrical energy. Several branches of power stealing blocks may provide power in parallel depending on the number of loads connected to the controller, thereby increasing power stealing capability. For the power stealing circuitry of this disclosure, each power stealing block may include a ground isolation circuit to avoid a risk of unintentionally activating a load while the load should be de-energized.

FIG. 1 is a block diagram illustrating a single stage controller with power stealing circuitry according to one or more techniques of this disclosure. In this disclosure, a controller for an environmental control system may be referred to as a thermostat, e.g., thermostat 40 as shown in the example of FIG. 1. However, thermostat 40 may include sensors for more than just temperature and operate the environmental control signals based on more than just comparing a measured temperature to a temperature setpoint. For example, thermostat 40 may include humidity sensors, air quality sensors, presence sensors, light sensors, and other circuitry that thermostat 40 may use to operate the environmental control system. In some examples, thermostat 40 may be operatively connected to external sensors, e.g., temperature, humidity and so on, that provide remote sensing to thermostat 40.

Environmental control system 10, in the example of FIG. 1, includes thermostat 40, a single load 30, and power transformer 20. Power transformer 20 is configured to convert line power to a lower voltage AC (alternating current) power used to operate environmental control system 10. In the example of FIG. 1, transformer 20 converts 120V AC line power, used in some parts of North America, to 24V AC power. In other regions, transformer 20 may be configured to operate at different voltages. Transformer 20 may be referred to as an AC power source in this disclosure.

Load 30 may be any type of load used in an environmental control system. As described above, some example loads may include a furnace, dehumidifier, geothermal heat pump, air conditioning unit and so on.

In the example of FIG. 1, thermostat 40 is a single-stage controller configured to control the operation of load 30. Thermostat 40 includes switching circuitry 42, capacitive isolation circuit 12, power stealing circuit 18, storage element 26, and processing circuitry 11. Thermostat 40 in the example of FIG. 1 is a simplified view of thermostat 40 to focus on the power stealing functions and circuitry of thermostat 40. In other examples, thermostat 40 may be implemented using more or fewer components than shown in the example of FIG. 1. Also, in other examples, thermostat 40 may include circuitry to control multiple stages with multiple loads.

As shown in environmental control system 10, thermostat 40 does not include a direct connection to C-wire 24 from transformer 20. Therefore, processing circuitry 11, switching circuitry 42 and other circuitry of thermostat 40 may operate based on power supplied by storage element 26. In the example of FIG. 1, to extend the amount of time that storage element 26 may supply power to thermostat 40, then thermostat 40 may include power stealing circuitry, e.g. a first power stealing circuit, which is power stealing circuit 18, and a second power stealing circuit, e.g., a power trickle circuit included in switching circuit 42. In some examples storage element 26 may be a capacitor, a super capacitor, a rechargeable battery, or some other form of electrical energy storage element. In some examples, storage element 26 may include some combination of storage elements. Because thermostat 40 is configured to steal power both when load 30 is energized or de-energized. In some examples, e.g., an example in which the maximum power demand of thermostat 40 is less than the minimum power delivered by each one of the power stealing circuits, thermostat 40 may not include storage element 26. In other examples, storage element 26 may be the only source of electrical power for the thermostat.

In other examples, environmental control system 10 may instead have a thermostat with direct connection to C-wire 24 to provide power directly to the thermostat and therefore may not use the power stealing functions described for thermostat 40. Table 1 lists some examples of environmental control system signals:

TABLE 1

HVAC Signals

| Signal ID | Wire Color Code | Description |
| --- | --- | --- |
| R | Red | Power, 24 Vac transformer |
| Rc | Red | Power - cooling, 24 Vac transformer |
| Rh | Red | Power - heat, 24 Vac transformer |
| C | Black/Blue | Common of 24 Vac transformer |
| W, W1 or W2 | White | Primary heat call relay |
| E | Brown | Emergency heat relay |
| Y or Y1 | Yellow | Primary cool call relay |
| Y2 | Yellow | Secondary cool call relay |
| G | Green | Fan relay |
| O | Orange | Heat Pump Reversing valve cooling |
| B | Blue | Heat Pump Reversing Valve Heat |

Switching circuitry 42 may include switches 38, isolation block 39, anti-series diodes 36 as well as communication circuitry, sensing circuitry, the power trickle circuit and other components not shown in FIG. 1. Isolation block 39 is configured to isolate the communication circuitry, which may be low power and low voltage, from the switching circuitry, which may be higher power and higher voltage. Switching circuitry 42 may communicate with processing circuitry 11 via communication link 14. Some examples of communications may include updating a configuration of switching circuitry 42, status messages, sensor signals and so on. Updating the configuration of switching circuitry 42 may include commands to turn on or off any of switches 38. Examples of status messages may include overcurrent, overvoltage, undervoltage and wire sensing functions, e.g., detection of loads connected, and so on. Switching circuitry 42 may also be referred to as a solid state relay (SSR) circuit in this disclosure.

In some examples, switching circuitry 42 may be implemented as an integrated circuit, such as an application specific integrated circuit (ASIC). In the example of FIG. 1, switches 38 are configured to control current from transformer 20 to load 30. In other words, opening switches 38 turns OFF load 30. Closing switches 38 may activate load 30. Anti-series diodes 36 are body diodes intrinsic to the structure of switches 38 may be configured to avoid extra heating in thermostat 40 by reducing additional voltage drop in the load path. Switches 38, and the associated diodes 36, are arranged "back to back" to fully disconnect the transformer from the load so that no current can flow when turned off.

The power trickle circuit of switching circuitry 42 may be configured to provide power to storage element 26 through capacitive isolation circuit 12 when switching circuitry 42 is configured to activate load 30. When thermostat 40 configures switching circuitry 42 to de-energize load 30, e.g., open switches 38 to turn OFF load 30, then switching circuitry 42 may disable the power trickle circuit and enable power stealing circuit 18. When enabled, power stealing circuit 18 may convert AC power from R-wire 22 into DC power to supply the components of thermostat 40 and/or charge storage element 26. In some examples, capacitive isolation circuit 12 may be considered a component of the power trickle circuit that provides electrical energy to storage element 26. Capacitive isolation 12 functions to isolate the high power/voltage circuitry from the low power/voltage circuitry while transferring energy from the high power/voltage circuitry to the low power/voltage circuitry.

The configuration of environmental control system 10 with thermostat 40 may provide advantages over other types of power stealing circuit configurations. For example, unlike some other techniques, thermostat 40 may not include an internal transformer. Also, the architecture of thermostat 40 may allow simplified control of the power stealing circuitry and other operation of thermostat 40. For example, in contrast to other techniques, thermostat 40 may include circuitry to limit the current to load 30 when load 30 is switched off, such as a current limiting resistor, rather than a complex control scheme such as a voltage control circuit, to prevent inadvertent activation of load 30 and to regulate the flow of energy to thermostat 40 and storage element 26. In this manner, thermostat 40 may operate with basic digital control signals rather than complex control circuitry. Other advantages may include fewer electronic devices to implement this power stealing approach, compared to other approaches. Fewer devices may result in less PCB area, e.g. a compact design, and less cost. The PCB area savings comes from the power stealing circuit simplicity, which uses only a few components and that the ASIC integrates most of the power trickle circuitry, with the exception of the isolation circuit. PCB area savings may provide advantages when available space, e.g. within a thermostat housing is very limited. Also, because of the simplicity, the number of potential failures may be less than more complex approaches, resulting in product robustness and fewer field returns.

Figure 2:
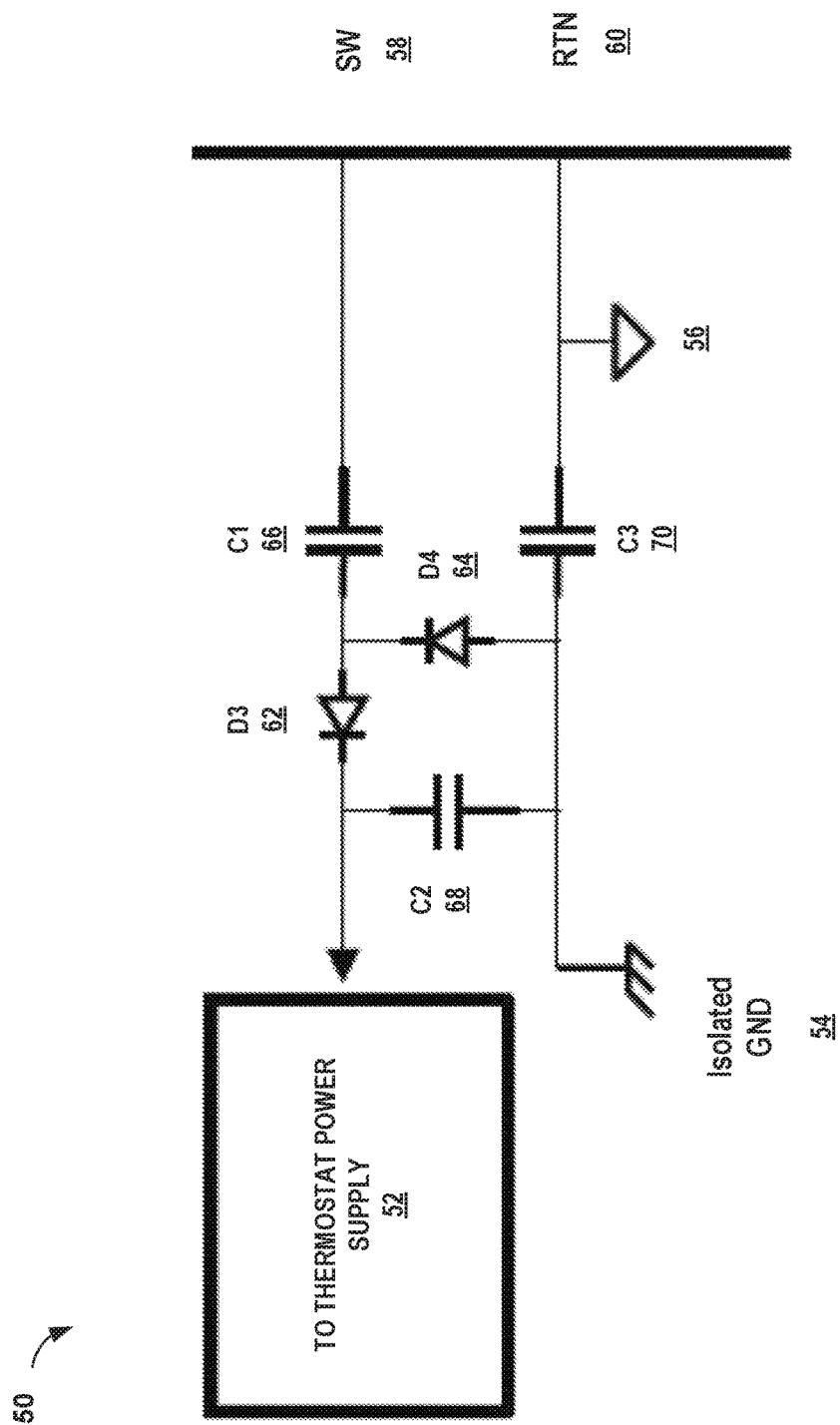
FIG. 2 is a schematic diagram illustrating an example implementation of a capacitive isolation circuit for the power stealing circuitry according to one or more techniques of this disclosure.

FIG. 2 is a schematic diagram illustrating an example implementation of a capacitive isolation circuit for the power stealing circuitry according to one or more techniques of this disclosure. Capacitive isolation circuit 50 is one example of how to implement capacitive isolation circuit 12 described above in relation to FIG. 1.

Capacitive isolation circuit 50 may connect to a thermostat power supply 52, as well as an isolated ground 54 and system ground 56. Capacitive isolation circuit may connect to switching circuitry, such as switching circuitry 42 described above in relation to FIG. 1 via SW terminal 58 and reference terminal RTN 60.

SW terminal 58 connects to a first terminal of capacitor C1 66. The second terminal of capacitor C1 66 connects to the cathode of diode D4 64 and the anode of diode D3 62. The cathode of diode D3 62 connects to a first terminal of capacitor C2 68 and to thermostat power supply 52. As described above in relation to FIG. 1, thermostat power supply 52 supplies the low voltage circuitry of the thermostat and may be isolated from the high voltage circuitry.

The second terminal of capacitor C2 68 connects to the anode of diode D4 64, a first terminal of capacitor C3 70 and to isolated ground 54. Reference terminal RTN 60 connects to the second terminal of capacitor C3 70 and to system ground 56.

Capacitive isolation circuit 50 converts a square waveform from switching circuitry, e.g. switching circuitry 42, to a constant voltage, which is used to charge a storage element, such as storage element 26 described above in relation to FIG. 1. The switching circuitry may output the square waveform via SW terminal 58 and reference terminal RTN 60. In some examples, the square waveform received by capacitive isolation circuit 50 may be set to five volts and 250 kHz.

Figure 3:
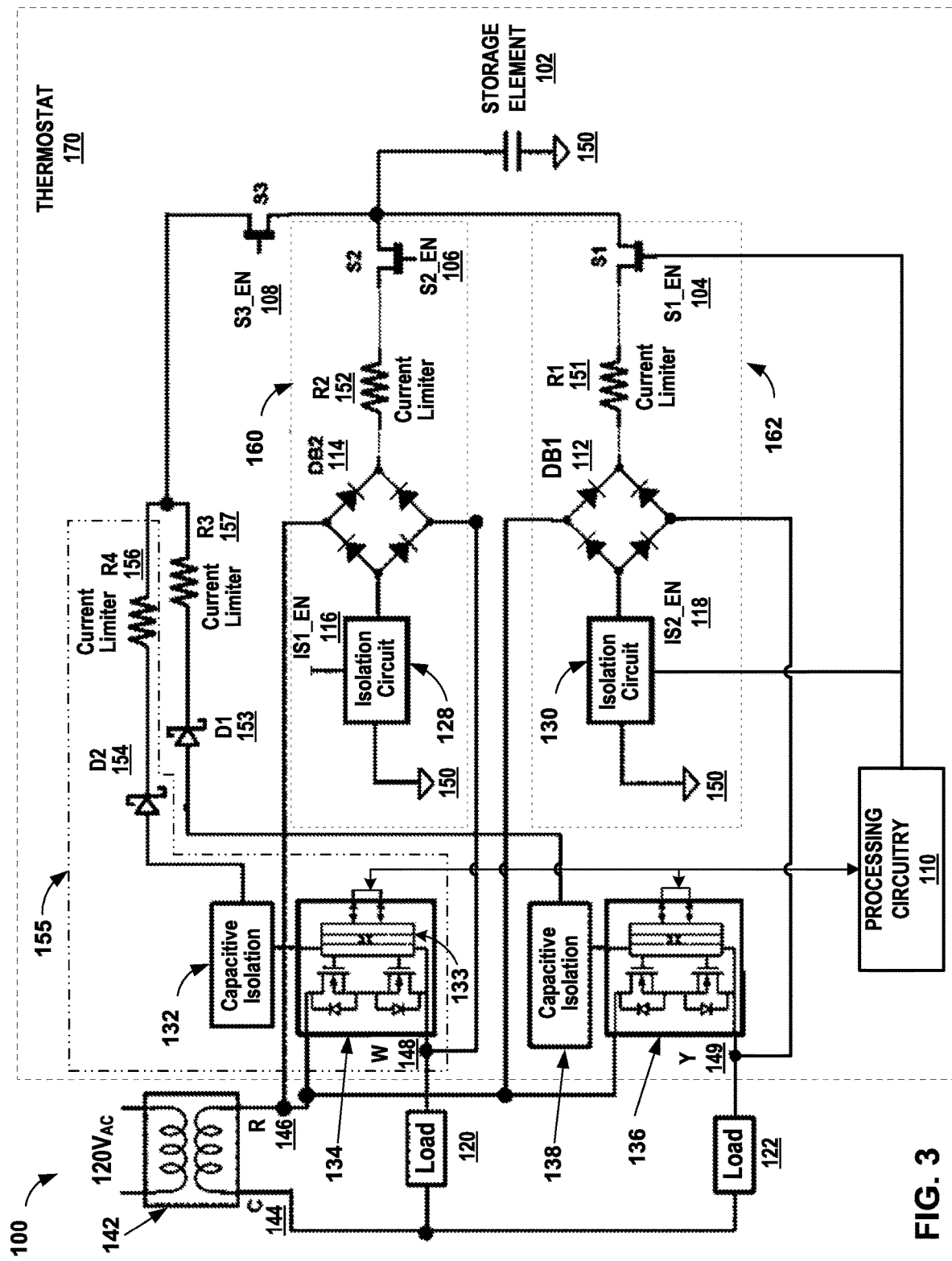
FIG. 3 is a schematic diagram illustrating an example of a multi-stage controller with power stealing circuitry according to one or more techniques of this disclosure.

FIG. 3 is a schematic diagram illustrating an example of a multi-stage controller with power stealing circuitry according to one or more techniques of this disclosure. In the example of system 100 in FIG. 3, thermostat 170, transformer 142, switching circuitry 134 and 136, capacitive isolation circuits 132 and 138, power stealing circuits 160 and 162 loads 120 and 122, and storage element 102 are, respectively, examples of thermostat 40, transformer 20, switching circuitry 42, capacitive isolation circuit 12, power stealing circuit 18, load 30 and storage element 126 described above in relation to FIG. 1 and therefore may have the same functions and characteristics as described above in relation to FIG. 1.

As with transformer 20, described above in relation to FIG. 1, transformer 142 includes common terminal, C-wire 144 and power terminal, R-wire 146. Switching circuitry 134 of thermostat 170 connects R-wire 146 to load 120 at W-wire 148. Similarly switching circuitry 136 connects R-wire 146 to load 122 at Y-wire 149. Load 120 and load 122 also connect to C-wire 144. However, thermostat 170 does not include a direct connection to C-wire 144, as described for thermostat 40 depicted in FIG. 1. Though not depicted in FIG. 3, in some examples, the techniques of this disclosure may also be applied to a system with a dual transformer.

As noted in Table 1, load 120, connected to W-wire 148 is a heating load, such as a furnace, electrical resistance heater or similar heating load. Load 122, connected to Y-wire 149 is a cooling load, such as an air conditioner. Activating load 120 will heat one or more rooms in a building that includes system 100. Activating load 122 will cool one or more rooms in the building that includes system 100.

R-wire 146 also connects to power stealing circuit 160 and power stealing circuit 162. In the example of FIG. 3, power stealing circuit 160 includes a diode bridge rectifier DB2 114, isolation circuit 128, current limiting resistor R2 152, and control switch S2. Isolation circuit 128 is configured to connect or isolate a first output terminal of DB2 114 from system ground 150, based on the enable signal IS1_EN 116, which comes from processing circuitry 110. The connection between IS1_EN 116 and processing circuitry 110 is not shown in FIG. 3 to simplify the schematic. Because the negative terminal of storage element 102 is also connected to system ground 150, isolation circuit 128 is configured to connect or isolate DB2 114 from storage element 102. Isolation circuits 128 and 130 are controlled ground isolation circuit, which may avoid sneak current paths that may cause circuit malfunction in system 100. System ground 150 may also be referred to as circuit ground, circuit reference voltage or system reference voltage in this disclosure.

Isolation circuits 128 and 130 may be implemented using one or more switch components. In some examples, isolation circuits 128 and 130 may include switch components, such as metal oxide semiconductor field effect transistors (MOSFET) in combination with other components. One example of an isolation circuit may be found in U.S. Pat. No. 10,601,421, which is hereby incorporated by reference.

A second output terminal from DB2 114 connects to switch S2 through resistor R2 152. Switch S2 connects to a positive terminal of storage element 102. Processing circuitry 110 controls the operation of switch S2 by S2_EN 106.

Similarly, power stealing circuit 162 includes a diode bridge rectifier DB1 112, isolation circuit 130, current limiting resistor R1 151, and control switch S1. Isolation circuit 130 is configured to connect or isolate a first output terminal of DB1 112 from system ground 150, based on the enable signal IS2_EN 118, which comes from processing circuitry 110. Because the negative terminal of storage element 102 is also connected to system ground 150, isolation circuit 130 is configured to connect or isolate DB1 112 from storage element 102. A second output terminal from DB1 112 connects to switch S1 through resistor R1 151. Switch S1 connects to the positive terminal of storage element 102. Processing circuitry 110 controls the operation of switch S1 via S1_EN 104.

In operation, when a load is switched OFF, e.g. when heating load 120 is de-energized, processing circuitry 110 may enable power stealing circuit 160. In other words, processing circuitry 110 may enable isolation circuit 128 to connect DB2 114 to system ground 150 and close switch S2. Diode bridge rectifier DB2 114 rectifies the AC supply power from R-wire 146 at the first input terminal of DB2 114. The second input terminal of DB2 114 connects to W-wire 148 and heating load 120. Current limiting resistor R2 152 is used to limit the current to a value small enough to avoid turning-on load 120. In other examples, current limiting resistor R2 152 may be any current limiting element comprising other components or combination of components configured to limit the current to avoid inadvertent activation of load 120.

Diode bridge rectifier DB2 114 is just one example implementation of rectification circuitry that may be applied to system 100, and other circuitry of this disclosure. Other examples of rectification circuitry that may be applied may include a synchronous rectification circuit, which may be implemented using MOSFETs, and a half waveform rectifier. Diode bridge rectifier DB2 114 may have advantage over a half waveform rectifier in that the half waveform rectifier may provide half the energy transfer capability. Diode bridge rectifier DB2 114 may be less complex and less costly than a synchronous rectification circuit.

Processing circuitry 110 controls switch S2 to control the flow of energy to storage element 102, for example, to avoid a maximum voltage rating for storage element 102. In some examples, processing circuitry may include a voltage sensing connection to storage element 102 (not shown in FIG. 3). Processing circuitry 110 may also open switch S2 to isolate power stealing circuit 160 and avoid sneak paths when other power stealing circuits in other stages of thermostat 170 are enabled.

Unlike other power stealing circuits, current limiting resistors R2 152 and R1 151 are configured to limit the current that may flow to the connected load, e.g., load 120 for R2 152 and load 122 for R1 151. Power stealing circuit 162 operates in a similar manner as described above for power stealing circuit 160. For example, when cooling load 122 is de-energized, processing circuitry 110 may enable power stealing circuit 162. In other words, processing circuitry 110 may enable isolation circuit 130 to connect DB1 112 to system ground 150 and close switch S1. Diode bridge rectifier DB1 112 rectifies the AC supply power from R-wire 146 at the first input terminal of DB1 112. The second input terminal of DB1 112 connects to Y-wire 149 and cooling load 122. Current limiting resistor R1 151 is used to limit the current flowing to storage element 102 to a value small enough to avoid turning-on load 122.

When a load, such as heating load 120 is to be energized, processing circuitry 140 may cause switching circuitry 134 to conduct power from R-wire 146 to W-wire 148 and disable power stealing circuit 160. Switching circuitry 134 is configured to switch on or off 24 VAC loads and steal power from the load it is switching, e.g. load 120, when load 120 is turned ON. In some examples, switching circuitry 134 may replace electromechanical relays to switch thermostat loads and also includes power stealing capacity using power trickle circuitry as described above for switching circuitry 42 in relation to FIG. 1. The example of thermostat 170 includes a power trickle circuit branch including switching circuitry 134, capacitive isolation circuit 132, Schottky diode D2 154, current limiting resistor R4 156 and control switch S3. Processing circuitry may control S3 via S3_EN 108. The connection between S3_EN 108 and processing circuitry 110 is not shown in FIG. 3 to simplify the schematic.

In this disclosure, the "power trickle circuit" may refer to any or all of the components in a power trickle branch, e.g., 155, that provides electrical energy to storage element 102, or directly to thermostat 170. In other words, the power trickle circuit may include the circuitry internal to switching circuitry 134 and 136 (not shown in FIG. 3), capacitive isolation circuit 132, Schottky diode D2 154, current limiting resistor R4 156, and in some examples switch S3. As described above for current limiting resistor R2 152, current limiting resistors R4 156 and R3 157 may be any current limiting element comprising other components or combination of components configured to limit the current.

Switching circuitry 134 outputs a square waveform to capacitive isolation circuit 132, as described above in relation to FIG. 2 for capacitive isolation circuit 50. Capacitive isolation circuit 132 may convert the received square waveform to a constant voltage, which may be applied to the positive terminal of storage element 102 through switch S3. The output voltage from capacitive isolation circuit 132 charges storage element 102 through series Schottky diode D2 154 and current limiting resistor R4 156. Schottky diode D2 154 blocks current from capacitive isolation circuit 138 when other stages, e.g. cooling load 122, are energized and heating load 120 is OFF. In this manner Schottky diodes D2 154, and D1 153, may allow to several power trickle branches to connect to the positive terminal of storage element 102 by blocking any reverse current or voltage to the respective capacitive isolation circuit. Similar to control switches S1 and S2 described above, processing circuitry 110 operates control switch S3 to avoid overcharging the storage element, as well as to break any sneak current paths that may be created when using the first power stealing circuits, e.g. power stealing circuits 160 and 162.

The power trickle circuit for switching circuitry 136 operates in a similar manner when processing circuitry 110 energizes cooling load 122. Processing circuitry 140 may cause switching circuitry 136 to conduct power from R-wire 146 to Y-wire 149 and disable power stealing circuit 162. Thermostat 170 includes the cooling load power trickle circuit branch including switching circuitry 136, capacitive isolation circuit 138, Schottky diode D1 153, and current limiting resistor R3 157. Control switch S3 also provides isolation for the power trickle circuit of switching circuitry 136. As described above, switching circuitry 136 outputs a square waveform to capacitive isolation circuit 138, which may convert the received square waveform to a constant voltage. The output of capacitive isolation circuit 138 may be applied to the positive terminal of storage element 102 through switch S3. The output voltage from capacitive isolation circuit 138 charges storage element 102 through series Schottky diode D1 153 and current limiting resistor R3 157. Also, diode bridge rectifiers DB2 114 and DB1 112 blocks any voltage from storage element 102 from reaching a load, and interfering with load activation when the power trickle circuit of switching circuitry 134 and 136 are operating, even if switches S1 or S2 are closed and conducting.

In addition, diode bridge rectifiers DB2 114 and DB1 112 should be configured to withstand any output voltage line transient from the output of transformer 142. For example, the diode bridge rectifier breakdown voltage should be selected to be higher than the highest transient voltage. In the example of system 100, the output voltage may be 24V, but may be set for other input and output voltages depending on the region in which system 100 operates.

The current limiting resistor for the first power stealing circuits 160 and 162 should be selected to avoid unintentionally turning-on the attached load, e.g. loads 120 and 122. In other words, the maximum current that can be used by system 100 to charge storage element 102 may be determined by the smallest current that may activates any load that could be connected to thermostat 170, connected to another similar low power device. The voltage rating for current limiting resistors R1 151 and R2 152 should be selected to withstands the highest transient voltage of system 100.

Processing circuitry may operate the controlled isolation circuits, e.g. isolation circuits 128 and 130 to be activated or deactivated depending the operation of system 100. The current limiting series resistor for the power trickle circuit, e.g. resistors R3 157 and R4 156, may be selected to limit the power trickle output to a magnitude less than a current that may impact the capacitive isolation voltage. In some examples, the power trickle current may be set to no more than 1.5 mA.

Though system 100 in the example of FIG. 3 depicts a two-stage thermostat, the techniques described above for system 100 may be extended to any number of stages. In other examples, system 100 may include additional stages, each stage with an associated load, switching circuitry, first power stealing circuit and connections to processing circuitry 110 and controlled ground isolation circuits to avoid sneak current paths that may cause circuit malfunction in system 100. As described above in relation to FIG. 1, additional stages may include a heat pump, an electrostatic filter, in-floor heating, baseboard heating, fans, and so on.

As described above in relation to FIG. 1, system 100 may provide advantages when compared to other types of power stealing circuitry. For example, the architecture of thermostat 170 does not require an internal transformer, which may increase the physical size and the cost of other power stealing circuitry that require a transformer. The isolation circuits and control switches provide a modular approach that allows adding more stages to a thermostat according to the techniques of this disclosure, e.g. 2H2C, 3H2C and so on. A thermostat of this disclosure may include switching circuitry, e.g. switching circuitry 134 and 136, that provides load switching, e.g. using a solid state relay circuit, along with a power trickle circuit for power stealing and other functions such as communication, over current protection, wire sensing and so on. In some examples, each instance of switching circuitry for thermostat 170 may be implemented as a separate integrated circuit, e.g. and ASIC, which may provide modular layout to support one or two to many stages.

The single fixed resistor between load and storage element in power stealing circuits 160 and 162 may provide a simple layout to prevent inadvertent load activation, without the need for complex control circuitry. Also, the components of thermostat 170 may be controlled with digital signals, e.g. S3_EN 108, IS2_EN 118 and so on, rather than a complex control scheme.

Figure 4:
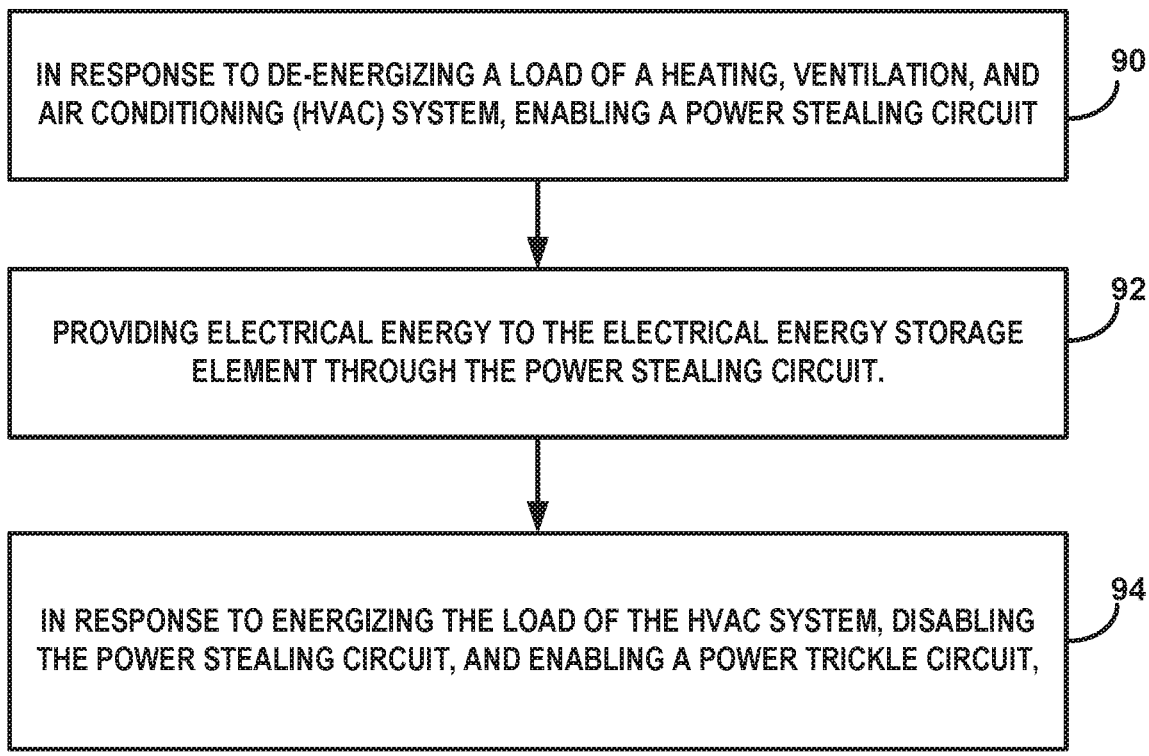
FIG. 4 is a flowchart illustrating an example operation of the power stealing circuitry according to one or more techniques of this disclosure.

FIG. 4 is a flowchart illustrating an example operation of the power stealing circuitry according to one or more techniques of this disclosure. The blocks of FIG. 4 will be described in terms of FIG. 3, unless otherwise noted.

In response to de-energizing a load of an environmental control system, such as turning off a furnace, electrical heating element and so on, processing circuitry 110 may enable a power stealing circuit, such as power stealing circuit 160 or 162 (90). In some examples, processing circuitry 110 may turn off a load in response to a temperature measurement from temperature sensor satisfying a temperature threshold. For example, a room temperature sensor may signal processing circuitry 110 that the room temperature exceeds the temperature setpoint. In response, processing circuitry may turn off the load, e.g. heating load 120.

Processing circuitry 110 may enable power stealing circuit 160, for example, by enabling switch S2 and isolation circuit 128, thereby providing electrical energy to electrical energy storage element 102 through power stealing circuit 160 (92). As described above in relation to FIG. 3, power stealing circuit 160 draws AC electrical energy from transformer 142, converts the AC energy and outputs DC energy to electrical storage element 102 or directly to thermostat 170.

In some examples, in response to energizing the load of the HVAC system, processing circuitry 110 may disable the power stealing circuit, and enable a power trickle circuit (94), such as the power trickle branch comprising switching circuitry 134, capacitive isolation circuit 132, diode D2 154 and current limiting resistor R4 156. Processing circuitry 110 may enable the power trickle circuit by switching on the load, thereby causing switching circuitry 134 to output the square wave signal to capacitive isolation circuit 132. Processing circuitry 110 may also close switch S3 using S3_EN 108.

Examples of processing circuitry, such as processing circuitry 11 and 110 described above in relation to FIGS. 1 and 3 may include any one or more of a microcontroller (MCU), e.g. a computer on a single integrated circuit containing a processor core, memory, and programmable input/output peripherals, a microprocessor (µP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. Accordingly, the terms "processing circuitry," "processor" or "controller," as used herein, may refer to any one or more of the foregoing structures or any other structure operable to perform techniques described herein.

In some examples processing circuitry of this disclosure may include memory or be operatively connected to a memory unit. Examples of memory may include any type of computer-readable storage media, including random access memory (RAM), read only memory (ROM), programmable read only memory (PROM), erasable programmable read only memory (EPROM), electronically erasable programmable read only memory (EEPROM), flash memory, and similar devices. In some examples the computer readable storage media may store instructions that cause the processing circuitry to execute the functions described herein. In some examples, the computer readable storage media may store data, such as configuration information, temporary values and other types of data used to perform the functions of this disclosure.

Various examples of the disclosure have been described. These and other examples are within the scope of the following claims.

What is claimed is:

1. A power stealing circuit comprising:
    rectification circuitry comprising an input terminal connected to an alternating current (AC) power source, a first output terminal, and a second output terminal;
    a current limiting element connected to the first output terminal of the rectification circuitry;
    an electrical energy storage element connected between the current limiting element and a circuit ground and configured to receive electrical energy from the rectification circuitry through the current limiting element;
    a rectifier isolation circuit connected to the second output terminal of the rectification circuitry and configured to connect or disconnect the second output terminal of the rectification circuitry from the circuit ground; and
    a second circuit configured as a power trickle circuit, the power trickle circuit configured to draw power from the AC power source while the load is energized, the power trickle circuit further configured to not draw power from the AC power source while the load is de-energized,
        wherein the power stealing circuit is configured to draw power from the AC power source while a load is de-energized; and
        wherein the power stealing circuit is configured to not draw power from the AC power source while the load is energized.

2. The circuit of claim 1, further comprising a switch located between the current limiting element and the electrical energy storage element, wherein the switch is configured to disable the power stealing circuit from delivering the electrical energy to the electrical energy storage element.

3. The circuit of claim 1, wherein the rectification circuitry is implemented as a diode bridge rectifier comprising four diodes.

4. The circuit of claim 1,
    wherein the isolation circuit comprises a controlled isolation circuit comprising an enable input terminal configured to control the operation of the isolation circuit, and
    wherein the isolation circuit is configured to connect or isolate the second output terminal of the rectification circuitry from the circuit ground based on a signal at the enable input terminal.

5. The circuit of claim 1, wherein the current limiting element comprises a resistor.

6. The circuit of claim 1,
    wherein the input terminal for the rectification circuitry is a first input terminal and the rectification circuitry further comprises a second input terminal;
    wherein the second input terminal of the rectification circuitry connects to the load; and
    wherein the current limiting element is configured to limit current from the first output terminal of the rectification circuitry such that current at the second input terminal of the rectification circuitry does not inadvertently activate the load when the load is switched off.

7. The circuit of claim 6, wherein the rectification circuitry is configured to block current from the electrical energy storage element from reaching the load.

8. The circuit of claim 1, wherein the AC power source comprises a transformer of an environmental sensing and control system.

9. A system comprising:
    a load;
    a power trickle circuit,
        wherein the power trickle circuit is configured to draw power from an alternating current (AC) power source while the load is energized; and
        wherein the power trickle circuit is configured to not draw power from the AC power source while the load is de-energized;
    a power stealing circuit comprising:
        a diode bridge rectifier comprising four diodes and an input terminal connected to the AC power source;
        a current limiting element connected to a first output terminal of the diode bridge rectifier;
        a rectifier isolation circuit connected to a second output terminal of the diode bridge rectifier and configured to connect or disconnect the second output terminal of the diode bridge rectifier from a circuit ground;
        wherein the power stealing circuit is configured to draw power from the AC power source while the load is de-energized; and
        wherein the power stealing circuit is configured to not draw power from the AC power source while the load is energized; and
    an electrical energy storage element connected between the current limiting element of the power stealing circuit and the circuit ground, the electrical energy storage element configured to receive electrical energy from the power stealing circuit through the current limiting element.

10. The system of claim 9, wherein the current limiting element is a first current limiting element, and wherein the power trickle circuit comprises:
    a diode;
    a second current limiting element; and
    a capacitive isolation circuit configured to output direct current (DC) power to the electrical energy storage element through the diode and the current limiting element.

11. The system of claim 10, wherein the capacitive isolation circuit is configured to receive a square wave signal and convert the square wave signal to the DC power.

12. The system of claim 10,
wherein the AC power source comprises a transformer of a heating, ventilation, and air conditioning (HVAC) system, and
wherein the load is one of a furnace, an air conditioning unit, an electrical heating element, a heat pump; a fan; an electrostatic filter or a dehumidifier.

13. The system of claim 9, further comprising a switch located between the current limiting element and the electrical energy storage element, wherein the switch is configured to disable the power stealing circuit from delivering the electrical energy to the electrical energy storage element.

14. The system of claim 9,
wherein the isolation circuit comprises a controlled isolation circuit comprising a enable input terminal, and
wherein the isolation circuit configured to connect or isolate the second output terminal of the diode bridge rectifier from circuit ground based on a digital signal at the enable input terminal.

15. The system of claim 9,
wherein the diode bridge rectifier comprises a first input terminal and a second input terminal;
wherein the first input terminal of the diode bridge rectifier connects to the AC power source;
wherein the second input terminal of the diode bridge rectifier connects to a load; and
wherein the current limiting element is configured to limit current from the first output terminal of the diode bridge rectifier such that current at the second input terminal of the diode bridge rectifier does not activate the load.

16. The system of claim 9, wherein the power stealing circuit is a first power stealing circuit, the load is a first load, and the power trickle circuit is a first power trickle circuit, the system further comprising:
a second power stealing circuit comprising a second diode bridge rectifier connected to the AC power source;
a second load; and
a second power trickle circuit, wherein the second power stealing circuit is configured to supply power to the electrical energy storage unit from the AC power source while the second load is de-energized, and
the second power trickle circuit is configured to supply power to the electrical energy storage unit from the AC power source while the second load is energized.

17. A method comprising:
de-energizing a load of an environmental sensing and control system, the environmental sensing and control system comprising a controller with an electrical energy storage element and a power stealing circuit;
in response to de-energizing, by the controller, the load, enabling the power stealing circuit, wherein the power stealing circuit comprises:
rectification circuitry comprising an input terminal connected to an alternating current (AC) power source of the environmental sensing and control system;
a current limiting element connected to a first output terminal of a rectification circuitry;
a rectifier isolation circuit connected to a second output terminal of the rectification circuitry and configured to connect and disconnect the second output terminal of the rectification circuitry from a circuit ground;
a power trickle circuit configured to draw power from the AC power source while the load is energized, the power trickle circuit further configured to not draw power from the AC power source while the load is de-energized;
providing electrical energy to the electrical energy storage element through the power stealing circuit while the load is de-energized;
energizing the load of the environmental sensing and control system; and
in response to energizing the load, disabling the power stealing circuit.

18. The method of claim 17, wherein the current limiting element is a first current limiting element, the method further comprising:
energizing, by the controller, the load;
in response to energizing the load, disabling the power stealing circuit, and enabling the power trickle circuit, the power trickle circuit comprising:
a diode;
a second current limiting element; and
a capacitive isolation circuit configured to output direct current (DC) power to the electrical energy storage element through the diode and the second current limiting element.

19. The method of claim 18, wherein the isolation circuit comprises an enable input terminal, the method further comprising connecting or disconnecting the second output terminal of the rectification circuitry from circuit ground based on a digital signal at the enable input terminal.

* * * * *